United States Patent
Newell et al.

(10) Patent No.: US 9,098,777 B2
(45) Date of Patent: Aug. 4, 2015

(54) METHOD AND SYSTEM FOR EVALUATING HANDWRITTEN DOCUMENTS

(75) Inventors: Roger A Newell, Pittsford, NY (US); Dennis L Venable, Marion, NY (US)

(73) Assignee: XEROX CORPORATION, Norwalk, CT (US)

( * ) Notice: Subject to any disclaimer, the term of this patent is extended or adjusted under 35 U.S.C. 154(b) by 279 days.

(21) Appl. No.: 13/604,662

(22) Filed: Sep. 6, 2012

(65) Prior Publication Data

US 2014/0064622 A1   Mar. 6, 2014

(51) Int. Cl.
*G06K 9/00* (2006.01)
*G06K 9/62* (2006.01)

(52) U.S. Cl.
CPC .......... *G06K 9/6292* (2013.01); *G06K 2209/01* (2013.01)

(58) Field of Classification Search
CPC ......... G06K 9/6262; G06K 9/18; G06K 9/30; G06K 9/72; G06K 9/2063
USPC ........................................................ 382/195
See application file for complete search history.

(56) References Cited

U.S. PATENT DOCUMENTS

| | | | |
|---|---|---|---|
| 2005/0249376 A1* | 11/2005 | Leo et al. | 382/101 |
| 2008/0227075 A1* | 9/2008 | Poor et al. | 434/307 R |
| 2011/0268360 A1* | 11/2011 | Antonijevic et al. | 382/177 |
| 2012/0189999 A1* | 7/2012 | Uthman et al. | 434/335 |

OTHER PUBLICATIONS (Wojciech Bieniecki, "Information Technologies in a Process of Examination in Poland", Centrum Nauczania Matematyki i Fizyki, Politechnika Lódzka Information systems in management VII Nov. 2010; Information Technologies in a Process of Examination in Poland—ResearchGate. Available from: http://www.researchgate.net/publication/229044843_INFORMATION).*

* cited by examiner

*Primary Examiner* — Stephen R Koziol
*Assistant Examiner* — Totam Le
(74) *Attorney, Agent, or Firm* — Jones Robb, PLLC

(57) ABSTRACT

A method, system, and computer program product for evaluating digital images of handwritten documents comprising handwritten symbols are disclosed. A set of symbols from the digital image is determined by applying a first predefined technique. If the set of symbols determined by applying the first predefined technique does not match with a predefined set of symbols, a second predefined technique is applied to determine the set of symbols from the digital image. Thereafter, an evaluation report is created based on the determining by applying the first predefined technique or the determining by applying the second predefined technique.

20 Claims, 7 Drawing Sheets

METHOD AND SYSTEM FOR EVALUATING HANDWRITTEN DOCUMENTS

TECHNICAL FIELD

The presently disclosed embodiments are related to processing of digital images. More particularly, the presently disclosed embodiments are related to a technique of evaluating digital images of handwritten documents.

BACKGROUND

In education, assessments are often given to students to assess the students' mastery of a subject. Many such assessments require the student to write an answer on the assessment. Various character recognition techniques/algorithms are available for recognizing such handwritten characters. In certain cases, these character recognition techniques may result in false negatives (i.e., correct answers that are scored as incorrect) when used to compare recognized characters with known answers. Further, some of the tools implementing the character recognition techniques offer a validation feature requiring a user (e.g., a teacher) to check each answer marked as wrong; however, too many false negatives may lead to user dissatisfaction.

SUMMARY

According to embodiments illustrated herein, there is provided a method implementable on a computing device for evaluating a digital image comprising handwritten symbols. The method includes determining a set of symbols from the digital image by applying a first predefined technique. If the set of symbols determined by applying the first predefined technique does not match with a predefined set of symbols, a second predefined technique is applied to determine the set of symbols from the digital image. Thereafter, an evaluation report is created based on the determining by applying the first predefined technique or the determining by applying the second predefined technique.

According to embodiments illustrated herein, there is provided a system for evaluating a handwritten document. The system comprises an image processing module and an evaluation module. The image processing module is configured for determining a set of symbols from a digital image by applying a first predefined technique, wherein the digital image is obtainable by scanning the handwritten document. The image processing module is also configured for determining the set of symbols from the digital image by applying a second predefined technique if the set of symbols identified using the first predefined technique does not match with a predefined set of symbols. The evaluation module is configured for creating an evaluation report based on the determining by applying the first predefined technique or the determining by applying the second predefined technique.

According to embodiments illustrated herein, there is provided a computer program product for use with a computer. The computer program product comprises a computer-usable data carrier storing a computer readable program code for evaluating a handwritten document. The computer readable program code comprises first program instruction means for facilitating scanning of the handwritten document to generate a digital image, second program instruction means for determining a set of symbols from the digital image, third program instruction means for determining the set of symbols from the digital image if the set of symbols identified by the second program instruction means does not match with a predefined set of symbols, and fourth program instruction means for creating an evaluation report based on the determining using the second program instruction means or the determining using third program instruction means.

BRIEF DESCRIPTION OF DRAWINGS

The accompanying drawings illustrate various embodiments of systems, methods, and embodiments of various other aspects of the invention. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
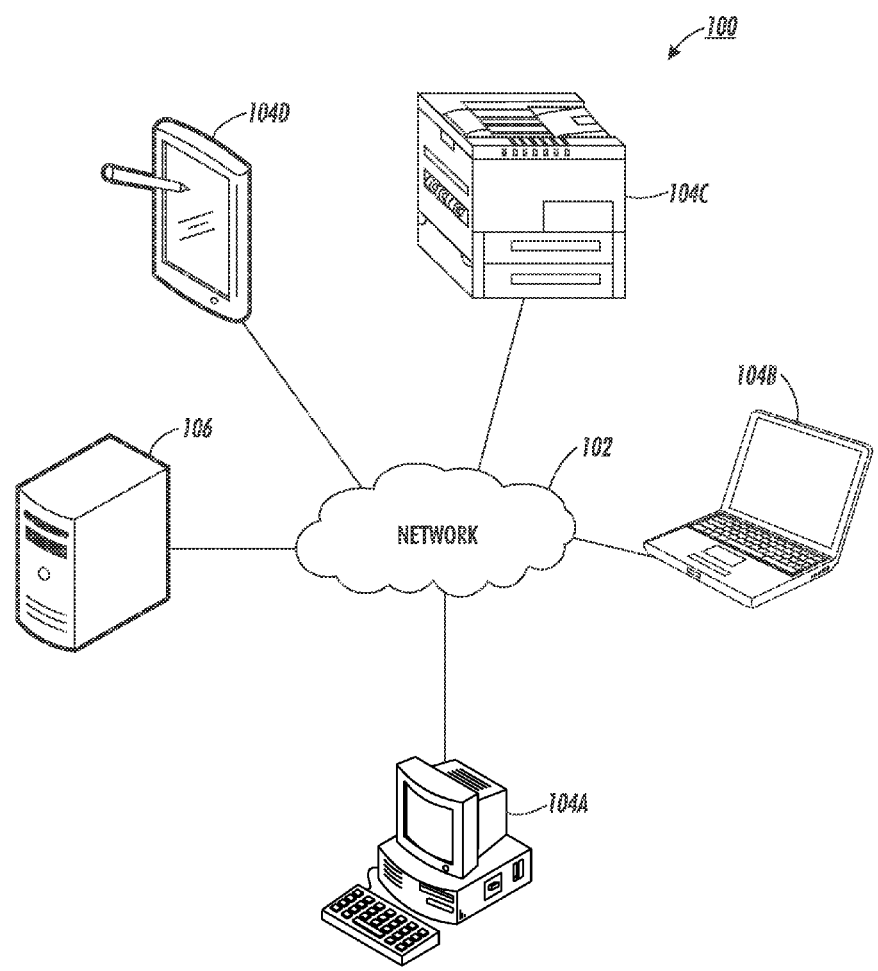
FIG. 1 is a block diagram illustrating a system environment in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "multifunction device" (MFD) refers to a device that can perform multiple functions. Examples of the functions include, but are not limited to, printing, scanning, copying, faxing, emailing, and the like.

A "digital image" or "scanned document" or "scanned image" refers to a collection of data, including image data in any format, retained in an electronic form. The digital image can contain one or more pictures, symbols, text, blank or non-printed regions, margins, etc. In an embodiment, the digital image is obtained by scanning a corresponding physical document (e.g., a handwritten document or a document containing handwritten symbols). The digital image can be stored in various file formats, such as, JPG or JPEG, GIF, TIFF, PNG, BMP, RAW, PSD, PSP, PDF, and the like. Various examples of the handwritten document include, but are not limited to, any questionnaire form, such as, a filled question paper, a survey paper, an answer sheet, an assessment document, or the like.

A "computing device" refers to a computer, a device including a processor/microcontroller and/or any other electronic component, device, or system that performs one or more operations according to one or more programming instructions. Examples of the computing device include, but are not limited to, a desktop computer, a laptop, a tablet computer (e.g., iPad®, Samsung Galaxy Tab®, and the like), a personal digital assistant (PDA), a smartphone, an MFD, and the like. The computing device is capable of accessing (or being accessed over) a network (e.g., using wired or wireless communication capabilities).

A "network" refers to a medium that interconnects a server and various computing devices. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), and IEEE 802.11n communication protocols.

"Scanning" refers to a technique of recording an image as digital data in any format, thereby creating a file.

A "symbol" refers to any alphabetic character, numeric character, mark, line, arrow, hand-drawn drawing, and the like.

FIG. 1 is a block diagram illustrating a system environment 100 in accordance with at least one embodiment. Various embodiments can be implemented in the system environment 100. The system environment 100 includes a network 102 and a server 106. The system environment 100 further includes a desktop computer 104a, a laptop 104b, an MFD 104c, and a tablet computer 104d (hereinafter referred to as computing device 104). Although FIG. 1 shows only four computing devices for simplicity, it may be appreciated that the disclosed embodiments can be implemented for a large number of computing devices including, but not limited to, smartphones, PDAs, and various similar handheld devices.

A user operating the desktop computer 104a, the laptop 104b, or the tablet computer 104d is capable of accessing the MFD 104c and/or the server 106 through the network 102. A functionality of evaluating handwritten documents (i.e., digital images of the handwritten documents) can be implemented on at least one of the desktop computer 104a, the laptop 104b, the MFD 104c, the tablet computer 104d, and the server 106. In an embodiment, for example, the desktop computer 104a, the laptop 104b, and/or the tablet computer 104d are capable of executing an application for evaluating digital images of the handwritten documents. In another embodiment, the application is hosted by the server 106 and the desktop computer 104a, the laptop 104b, and/or the tablet computer 104d capable of accessing the application over the network 102. In another embodiment, the MFD 104c is adapted to facilitate the functionality of evaluating the digital images of the handwritten documents.

Figure 2:
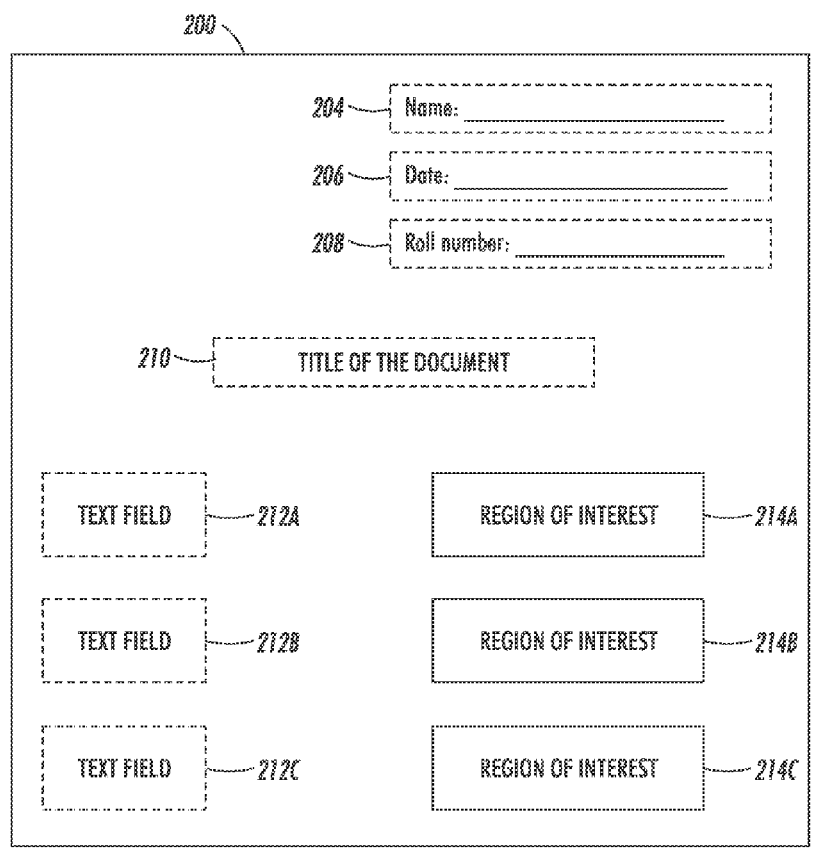
FIG. 2 depicts a layout of a handwritten document in accordance with at least one embodiment.

FIG. 2 depicts a layout 200 of a handwritten document in accordance with at least one embodiment. The layout 200 depicts various fields, such as a name field 204, a date field 206, a roll number field 208, and a title field 210. The layout 200 further depicts various text fields 212a, 212b, and 212c (hereinafter referred to as text field 212). Although the layout 200 shows only three text fields for simplicity, it may be appreciated that the disclosed embodiments can be implemented for a large or lesser number of text fields. Furthermore, the layout 200 depicts various regions of interest 214a, 214b, and 214c (hereinafter referred to as region of interest 214). Although the layout 200 shows only three regions of interest for simplicity, it may be appreciated that the disclosed embodiments can be implemented for a large or lesser number of regions of interest. Further, for each region of interest 214 the correct response that is expected for that region is known.

In an embodiment, the text field 212 contains a question or any other query for which a user's (e.g., a student's) response is required in the corresponding region of interest 214. For example, for questions contained in text fields 212a, 212b, and 212c, the corresponding answers (i.e., answers written by the user) are contained in the regions of interest 214a, 214b, and 214c respectively. In an embodiment, the answers are handwritten by the user (e.g., student). The answers contains various symbols including, but not limited to, alphabetic characters, numeric characters, marks, line arts, boxes, shapes, or hand-drawn drawings. Further, for each region of interest 214 the correct answers to the associated questions in text fields 212 are known.

Figure 3:
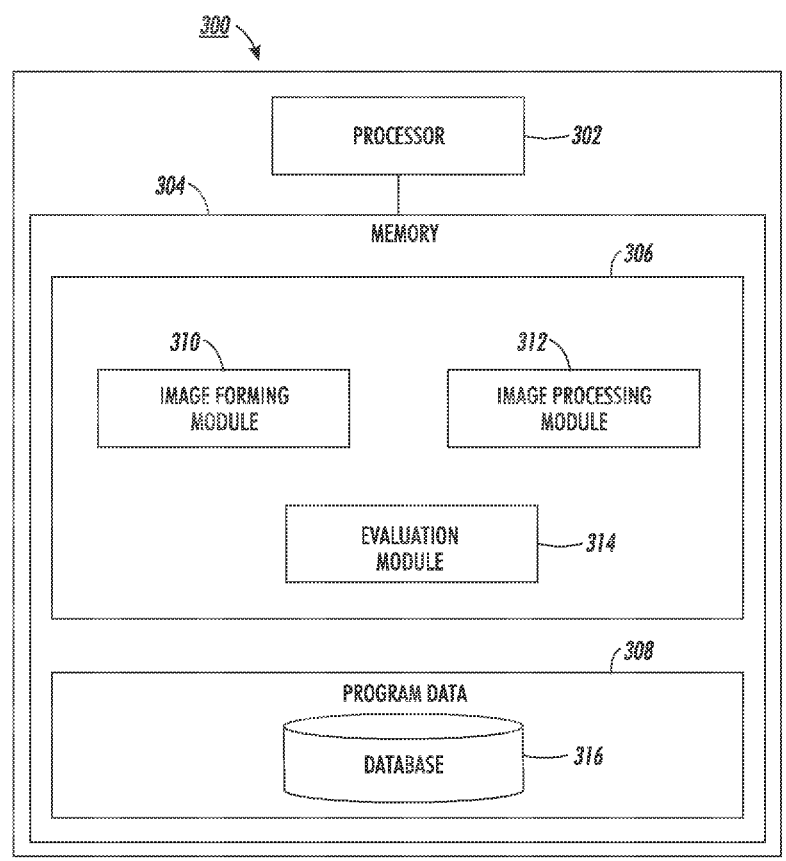
FIG. 3 is a block diagram illustrating a system for evaluating digital images of handwritten documents in accordance with at least one embodiment.

FIG. 3 is a block diagram illustrating a system 300 for evaluating digital images of handwritten documents in accordance with at least one embodiment. In an embodiment, the system 300 represents the computing device 104. In another embodiment, the system 300 represents the server 106. The system 300 includes a processor 302 coupled to a memory 304. The memory 304 includes a program module 306 and a program data 308. The program module 306 includes an image forming module 310, an image processing module 312, and an evaluation module 314. The program data 308 includes a database 316.

The processor 302 is coupled to the memory 304. In an embodiment, the processor can also be connected to a display (not shown) and one or more input mediums (not shown). The processor 302 executes a set of instructions stored in the memory 304 to perform one or more operations. The processor 302 can be realized through a number of processor technologies known in the art. Examples of the processor 302 can include, but are not limited to, an X86 processor, a RISC processor, an ASIC processor, a CISC processor, or any other processor. In an embodiment, the processor 302 includes a Graphics Processing Unit (GPU) that executes the set of instructions to perform one or more image processing operations.

The memory 304 stores a set of instructions and data. Some of the commonly known memory implementations can be, but are not limited to, a Random Access Memory (RAM), Read Only Memory (ROM), Hard Disk Drive (HDD), and a secure digital (SD) card. The program module 306 includes a set of instructions that are executable by the processor 302 to perform specific actions. It is understood by a person having ordinary skills in the art that the set of instructions are stored in the memory 304 in conjunction with various hardware of the system 300 to perform various operations.

The database 316 is a storage device that stores the data submitted from and/or required by the image-forming module 310, the image processing module 312, and the evaluation module 314. Further, the database 316 stores a model of assessment containing correct answers corresponding to each text field 212. Each of the correct answers contains a predefined set of symbols. In an embodiment, the model of assessment is inputted by an administrator (e.g., the teacher). In an embodiment, the database 316 can be implemented using technologies including, but not limited to Oracle®, IBM DB2®, Microsoft SQL Server®, Microsoft Access®, PostgreSQL®, MySQL® and SQLite®, and the like.

The image-forming module 310 is configured for facilitating the generation of the digital image based on the handwritten document. In an embodiment, the image-forming module 310 facilitates the scanning of the handwritten documents. The image-forming module 310 facilitates the compilation of the image data captured by various image-capturing units such as scanners and digital cameras (not shown) to generate the digital images (e.g., scanned documents) from the handwritten documents. The image-forming module 310 then stores the digital images in the database 316.

In an embodiment, the system 300 obtains the digital images of the handwritten documents from various other computing devices (such as computing device 104) or the server 106 and hence the use of the image-forming module 310 can be avoided. The digital images of the handwritten documents are stored in the database 316.

The image processing module 312 is configured for identifying the regions of interest 214a, 214b, and 214c from the digital image of the handwritten document (e.g., an assessment/answer paper filled by the student).

In an embodiment, in order to identify the regions of interest 214a, 214b, and 214c, the image processing module 312 implements a coordinate-based method. In this case, coordinates of the regions of interest are known relative to a master digital image (e.g., scanned copy of the blank assessment/answer paper). A scanned image is registered to the master digital image (e.g., the scanned image is digitally processed such that it can exactly overlap the master digital image). This is known as image registration and can be implemented using several well-known techniques, e.g., 4-point registration or band-based registration. Once the scanned image is registered to the master digital image, the known coordinates of the regions of interest associated with the master digital image can be directly applied to the registered scanned image to identify exact regions of interest in the scanned digital image. Thus, when the user (teacher) initiates the process of evaluating the digital image of the assessment/answer paper of a particular student, the image processing module 312 identifies the regions of interest 214a, 214b, and 214c based on the corresponding coordinates derived from the master digital image. In an embodiment, the master digital image, the known coordinates of the regions of interest 214, and the known correct answers are stored in the database 316.

In another embodiment, the image processing module 312 identifies the regions of interest 214a, 214b, and 214c by detecting various line arts like various boxes, colors, and shapes. However, it is understood that the invention is not limited with respect to the method of identifying the regions of interest 214a, 214b, and 214c from the digital image and any suitable techniques can be used for identifying the regions of interest 214a, 214b, and 214c.

The image processing module 312 is configured for determining a set of symbols from the digital image by applying a first predefined technique. If the set of symbols determined by applying the first predefined technique does not match with the predefined set of symbols, then the image processing module 312 is further configured for determining the set of symbols from the digital image by applying a second predefined technique.

In an embodiment, the first predefined technique can be implemented using various known Intelligent Character Recognition (ICR) engines including, but not limited to, various suitable solutions provided by Pegasus®, Nuance®, and LeadTools®. In an embodiment, the second predefined technique can be implemented using various known ICR engines, such as, various suitable solutions (other than the one used for the first predefined technique) provided by Pegasus®, Nuance®, and LeadTools®.

In another embodiment, both the first predefined technique and the second predefined technique are implemented using a common single ICR engine. However, different image pre-processing techniques are used for the first predefined technique and the second predefined technique. In an embodiment, for example, the first predefined technique is implemented using a Pegasus® ICR engine in combination with an ICR optimized image pre-processing technique. In an embodiment, for example, the second predefined technique is implemented using the Pegasus® ICR engine in combination with a mark lift optimized image pre-processing technique. Thus, by applying such different pre-processing techniques the system 300 is capable of evaluating questions, such as math questions as well as a variety of other questions that do not require ICR but only look for pencil marks on the page, such as a mark in a checkbox for a multiple choice.

Figure 5:
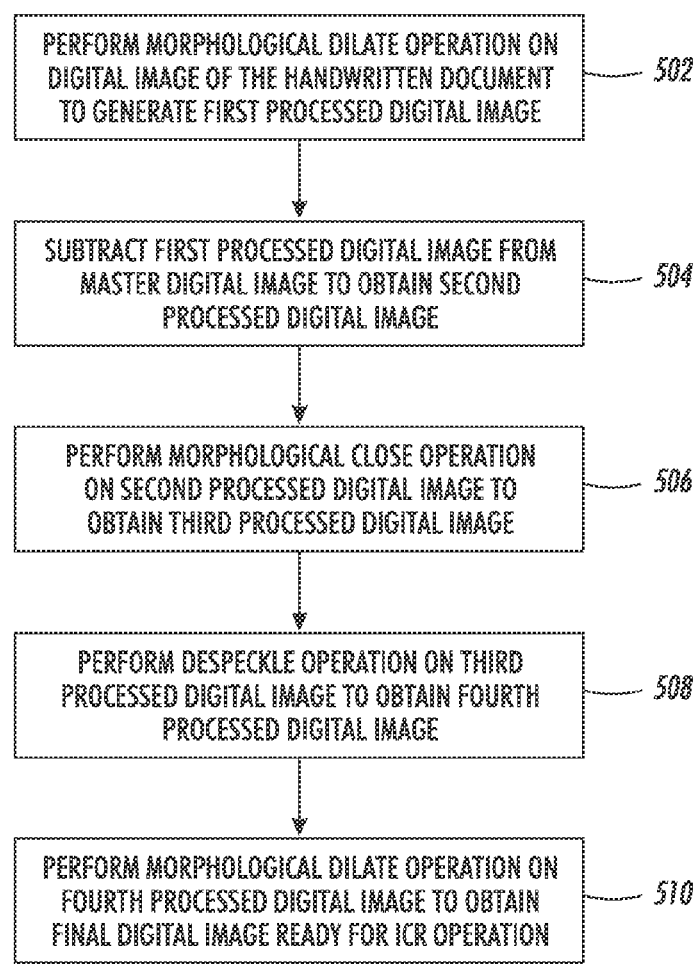
FIG. 5 is a flow diagram illustrating an example of an Intelligent Character Recognition (ICR) optimized image pre-processing technique.

The ICR optimized image pre-processing technique is suitable mainly for recognizing handwritten alphabetic and numeric characters. Various known ICR optimized image pre-processing techniques can be used without limiting the scope of the ongoing description. For example, FIG. 5 illustrates one such ICR optimized image pre-processing technique.

Figure 6:
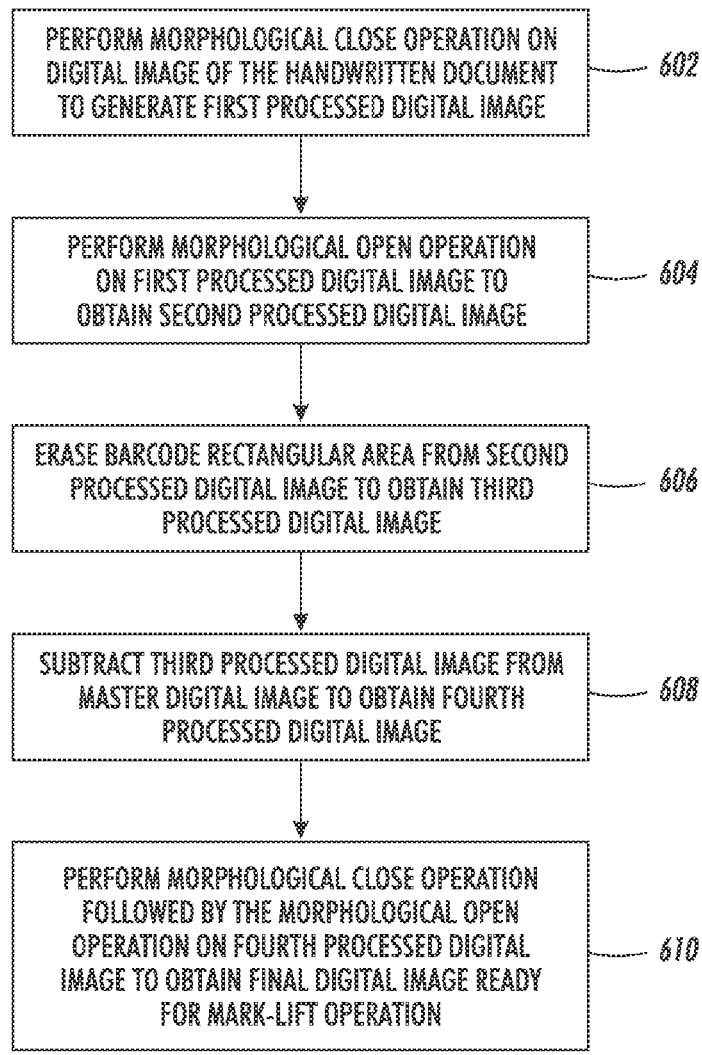
FIG. 6 is a flow diagram illustrating an example of a mark lift optimized image pre-processing technique.

The mark lift optimized image pre-processing technique is suitable mainly for recognizing various marks and various hand-drawn drawings including, but not limited to, lines, shapes, boxes, arrows, and the like. Various known mark lift optimized image pre-processing techniques can be used without limiting the scope of the ongoing description. For example, FIG. 6 illustrates one such mark lift optimized image pre-processing technique.

Furthermore, it is predefined/presumed that there are very rare false positives, i.e., it is very rare that the any of the first predefined technique or the second predefined technique decides that the student wrote a correct answer if the written answer was actually wrong—empirically 1 in 50,000.

Further, the first predefined technique and the second predefined technique are illustrated for simplicity of explanation; however, the image processing module 312 is not limited with respect to the number of techniques for identifying the set of symbols from the digital image. The number of techniques in cascade (in series or one after another, i.e., if a former technique fails to correctly determine the set of symbols then a next technique can be applied to determine the set of symbols) can be used by the image processing module 312 to determine the set of symbols from the digital image.

The evaluation module 314 is configured for creating an evaluation report based on the determining by applying the first predefined technique or the determining by applying the second predefined technique. For example, if the set of symbols determined by applying the first predefined technique matches with the predefined set of symbols, then the evaluation module 314 determines that the corresponding answer written by the student is correct. For example, if the set of symbols determined by applying the first predefined technique does not match with the predefined set of symbols, then the evaluation module 314 compares the set of symbols determined by applying the second predefined technique with the predefined set of symbols. Similarly, the evaluation module 314 determines the correctness of the written answers in the other such regions of interest based on the determining using the second predefined technique.

The evaluation module 314 generates an evaluation report based the determinations made. In an embodiment, the evaluation report includes information, such as, whether each answer is correct or wrong, various scores or grades derived based on the number of correct and the number of wrong answers, and so forth.

Figure 4A:
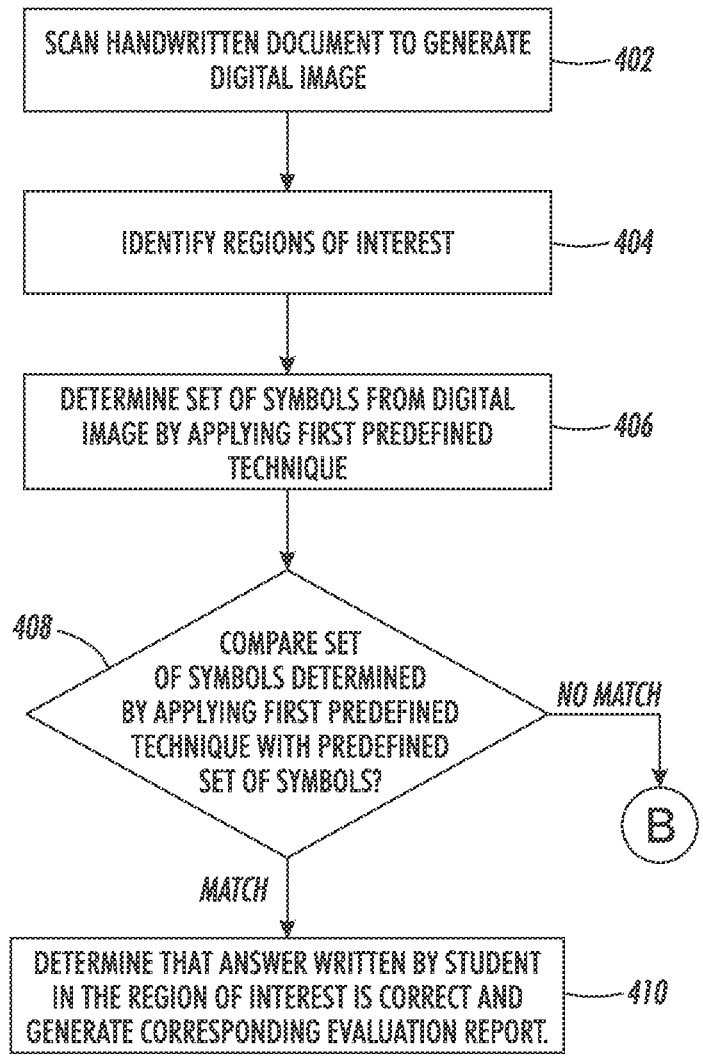
FIG. 4a and FIG. 4b (hereinafter referred to as FIG. 4) is a flow diagram illustrating a method for evaluating digital images of handwritten documents in accordance with at least one embodiment.
Figure 4B:
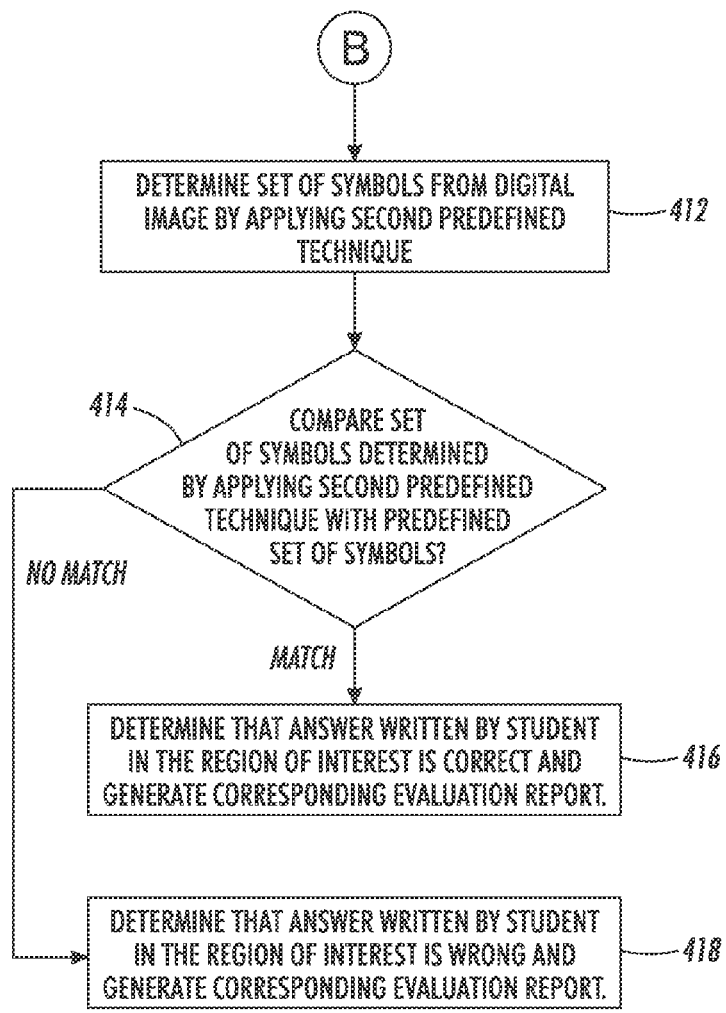

FIG. 4 is a flow diagram illustrating a method for evaluating digital images of handwritten documents in accordance with at least one embodiment.

At step 402, the handwritten document is scanned to generate a corresponding digital image. In an embodiment, the scanning of the handwritten document is facilitated by the image-forming module 310 in conjunction with hardware, such as scanners and digital cameras (not shown). The digital image is then stored in the database 316 by the image-forming module 310.

In an embodiment, the digital image is obtained by the system 300 from various other computing devices (such as computing device 104) or the server 106 and hence the step 402 can be avoided.

At step 404, the regions of interest 214a, 214b, and 214c are identified. In an embodiment, the regions of interest 214a, 214b, and 214c are identified by the image processing module 312 from the digital image.

At step 406, the set of symbols are determined from the digital image by applying the first predefined technique. In an embodiment, the set of symbols are determined from the each of region of interest 214 by the image processing module 312. In an embodiment, the first predefined technique is implemented using various known ICR engines, such as, various suitable solutions provided by Pegasus®, Nuance®, and LeadTools®. In another embodiment, the first predefined technique is implemented using the ICR optimized image pre-processing technique in combination with the various ICR engines, such as, various suitable solutions provided by Pegasus®, Nuance®, and LeadTools®. In this case, the ICR optimized image pre-processing technique is first applied to pre-process the digital image so as to facilitate better extraction of the alphabetic and numeric characters from the region of interest 214. Then any suitable ICR engine is executed to determine the symbols contained in each region of interest 214.

At step 408, the set of symbols (in the region of interest 214) determined by applying the first predefined technique is compared with the predefined set of symbols (corresponding to the region of interest 214) stored in the assessment model. If it is determined that the set of characters determined by applying the first predefined technique matches with the corresponding predefined set of symbols, step 410 is followed.

At step 410, it is determined that the answer written by the student in the region of interest 214 is correct and the corresponding evaluation report is generated. In an embodiment the evaluation report is generated by the evaluation module 314.

If it is determined, at step 408, that the set of characters determined by applying the first predefined technique does not match with the corresponding predefined set of symbols, step 412 is followed.

At step 412, the set of symbols are determined from the digital image by applying the second predefined technique. In an embodiment, the set of symbols are determined by the image processing module 312. In an embodiment, the second predefined technique is implemented using various known ICR engines (other than those implanted by the first predefined technique), such as, various suitable solutions provided by Pegasus®, Nuance®, and LeadTools®. In another embodiment, the first predefined technique is implemented using the mark lift optimized image pre-processing technique in conjunction with the various ICR engines, such as, various suitable solutions provided by Pegasus®, Nuance®, and LeadTools®. In this case, the mark lift optimized image pre-processing technique is first applied to pre-process the digital image so as to facilitate better extraction of various marks and various hand-drawn drawings including, but not limited to, lines, shapes, boxes, arrows, and the like from the region of interest 214. Then any suitable ICR engine is executed to determine the symbols contained the each region of interest 214.

At step 414, the set of symbols (in the region of interest 214) determined by applying the second predefined technique is compared with the predefined set of symbols (corresponding to the region of interest 214) stored in the assessment model. If it is determined that the set of characters determined by applying the second predefined technique matches with the corresponding predefined set of symbols, step 416 is followed.

At step 416, it is determined that the answer written by the student in the region of interest 214 is correct and the evaluation report is generated. In an embodiment the evaluation report is generated by the evaluation module 314.

If it is determined, at step 414, that the set of characters determined by applying the first predefined technique does not match with the corresponding predefined set of symbols, step 418 is followed.

At step 418, it is determined that the answer written by the student in the region of interest 214 is wrong/incorrect and the corresponding evaluation report is generated. In an embodiment the evaluation report is generated by the evaluation module 314.

If it is determined, at step 414, that the set of characters determined by applying the first predefined technique does not match with the corresponding predefined set of symbols, in an embodiment, a third predefined technique is applied to determine the set of symbols from the digital image. Thus, the ongoing description is not limited with respect to the number of techniques for determining the set of symbols.

FIG. 5 is a flow diagram illustrating an example ICR optimized image pre-processing technique.

At step 502, a morphological dilate operation is performed on the digital image of the handwritten document to generate a first processed digital image. In an embodiment, the morphological dilate operation is performed using a 5×5 filter to thicken the symbols (e.g., the text) present in the digital image.

At step 504, the first processed digital image is subtracted from the master digital image to obtain a second processed digital image. In order to perform the subtraction, various known image subtraction techniques/algorithms are implemented by the image processing module 312 without limiting the scope of the ongoing description.

At step 506, a morphological close operation is performed on the second processed digital image to obtain a third processed digital image. In an embodiment, the morphological close operation is performed using a 3×3 filter to fill in the gaps in the text (e.g., the symbols) present in the second processed digital image.

At step 508, a despeckle operation is performed on the third processed digital image to obtain a fourth processed digital image. In an embodiment, the despeckle operation is performed to remove small, isolated noise less than 4×4 pixels from the third processed digital image.

At step 510, a morphological dilate operation is performed on the fourth processed digital image to obtain a final digital image ready for ICR operation. In an embodiment, the morphological dilate operation is performed using a 3×3 filter to fill in gaps in the text (e.g., the symbols) present in the fourth processed digital image.

The final digital image is now ready for performing an ICR operation by using any suitable ICR engine as discussed in the step 406 (refer FIG. 4).

FIG. 6 is a flow diagram illustrating an example mark lift optimized image pre-processing technique.

At step 602, a morphological close operation is performed on the digital image of the handwritten document to generate a first processed digital image. In an embodiment, the morphological close operation is performed using a 5×5 filter to fill small gaps in the text (e.g., the symbols) present in the digital image.

At step 604, a morphological open operation is performed on the second processed digital image to obtain a third processed digital image. In an embodiment, the morphological open operation is performed using a 3×3 filter to remove small spots from the second processed digital image.

At step 606, any barcode rectangular area (if present) is erased from the second processed digital image to obtain a third processed digital image.

At step 608, the third processed digital image is subtracted from the master digital image to obtain a fourth processed digital image. In order to perform the subtraction, various known image subtraction techniques/algorithms are implemented by the image processing module 312 without limiting the scope of the ongoing description.

At step 610, a morphological close operation is performed followed by the morphological open operation on the fourth processed digital image to obtain a final digital image ready for mark lift operation.

The final digital image is now ready for performing a mark lift operation (i.e., identifying various marks, line art, boxes, shapes, and hand-drawn drawings) by using any suitable ICR engine as discussed in the step 412 (refer FIG. 4).

Various image processing operations mentioned in the explanation of FIG. 5 and FIG. 6, such as, the morphological dilate operation, the image subtraction, the morphological close operation, the despeckle operation, and the erasing of any image data are known in the art and as such, the detailed description of these known image processing operations is not included in the ongoing description.

The disclosed methods and systems, as illustrated in the ongoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through an input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in computers. The instructions for the disclosure can be written in all programming languages including, but not limited to, 'C', 'C++', 'Visual C++', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to, improving the accuracy of handwriting recognition by applying multiple ICR engines or multiple image pre-processing techniques (e.g., the ICR optimized image pre-processing technique, the mark lift optimized image pre-processing technique, and so forth) one after the other, in a serial fashion. Further, based on the model of assessment, the answers corresponding to the queries contained in the digital image are already known and the ICR engines and/or the image pre-processing techniques are selected such that the false positives are very rare. Due to this property of the ICR engines and the image pre-processing techniques in conjunction with their sequential application (e.g., one after the other), higher the overall accuracy of handwriting recognition is achieved. Further, various characters, marks, lines, arrows, shapes, and hand-drawn drawings can be detected by applying different image pre-processing techniques one after other.

Various embodiments of the method and system for evaluating handwritten documents have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above-disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method implementable on a computing device for evaluating a digital image comprising handwritten symbols, the method comprising:
   determining, by a processor associated with the computing device, a set of symbols from the digital image by applying a first predefined technique that facilitates the extraction of alphanumeric characters;
   comparing the determined set of symbols to a predefined set of symbols;
   determining, by the processor, a second set of symbols from the digital image by applying a second predefined technique if the set of symbols determined by applying the first predefined technique does not match with the predefined set of symbols, wherein the second predefined technique facilitates extraction of at least one of hand drawings, shapes, boxes, and arrows;
   comparing the determined second set of symbols to the predefined set of symbols; and
   creating, by the processor, an evaluation report based on the determining by applying the first predefined technique or the determining by applying the second predefined technique, wherein the evaluation report indicates a match when at least one of the determined set of symbols or the determined second set of symbols matches the predefined set of symbols.

2. The method of claim 1 further comprising scanning, by the processor, a handwritten document to generate the digital image.

3. The method of claim 1, wherein the digital image comprises one or more text fields and one or more regions of interest corresponding to each of the one or more of text fields.

4. The method of claim 3, wherein the predefined set of symbols corresponds to pre-stored answers for each of the one or more text fields.

5. The method of claim 3 further comprising identifying, by the processor, the one or more regions of interest from the digital image.

6. The method of claim 3, wherein user inputs are provided in the one or more regions of interest in response to each the one or more text fields.

7. The method of claim 6, wherein the set of symbols corresponds to the user inputs.

8. The method of claim 1, wherein the set of symbols comprises at least one of one or more alphabetic characters, one or more numeric characters, one or more marks, or one or more hand-drawn drawings.

9. The method of claim 1, wherein the first predefined technique applies a first pre-processing technique to identify the set of symbols.

10. The method of claim 9, wherein the first pre-processing technique is an Intelligent Character Recognition (ICR) optimized image pre-processing technique.

11. The method of claim 1, wherein the second predefined technique applies a second pre-processing technique to identify the set of symbols.

12. The method of claim 11, wherein the second pre-processing technique is a mark lift optimized image pre-processing technique.

13. The method of claim 1 further comprising presenting, on a display screen associated with the computing device, the evaluation report.

14. A system for evaluating a handwritten document, the system comprising:
   an image processing module configured for:
      determining a set of symbols from a digital image by applying a first predefined technique that facilitates the extraction of alphanumeric characters, wherein the digital image is obtainable by scanning of the handwritten document;
      comparing the determined set of symbols to a predefined set of symbols;
      determining a second set of symbols from the digital image by applying a second predefined technique if the set of symbols, determined by applying the first predefined technique, is determined to be incorrect based on matching between the set of predefined symbols with the set of symbols, wherein the second predefined technique facilitates extraction of at least one of hand drawings, shapes, boxes, and arrows;
      comparing the determined second set of symbols to the predefined set of symbols; and
   an evaluation module configured for creating an evaluation report based on the determining using the first predefined technique or the determining using the second predefined technique, wherein the evaluation report indicates a match when at least one of the determined set of symbols or the determined second set of symbols matches the predefined set of symbols.

15. The system of claim 14, wherein the set of symbols comprises at least one of one or more alphabetic characters or one or more numeric characters.

16. The system of claim 14 further comprising an image forming module configured for facilitating the generation of the digital image based on the handwritten document.

17. A computer program product for use with a computer, the computer program product comprising a non-transitory computer readable medium, wherein the non-transitory computer readable medium stores a computer program code for evaluating a handwritten document, wherein the computer program code is executable by one or more processors to:
determine a set of symbols from the digital image by applying a first predefined technique that facilitates the extraction of alphanumeric characters;
compare the determined set of symbols to a predefined set of symbols;
determine a second set of symbols from the digital image by applying a second predefined technique if the set of symbols determined by applying the first predefined technique does not match with the predefined set of symbols, wherein the second predefined technique facilitates extraction of at least one of hand drawings, shapes, boxes, and arrows;
compare the determined second set of symbols to the predefined set of symbols; and
create an evaluation report based on the determining by applying the first predefined technique or the determining by applying the second predefined technique, wherein the evaluation report indicates a match when at least one of the determined set of symbols or the determined second set of symbols matches the predefined set of symbols.

18. The computer program product of claim 17, wherein the computer program code is further executable by the one or more processors to present the evaluation report.

19. The method of claim 1, wherein applying the first predefined technique comprises:
generating a first processed digital image by performing one or more morphological operations on the digital image; and
subtracting the generated first processed digital image from the digital image.

20. The system of claim 14, wherein applying the first predefined technique comprises:
generating a first processed digital image by performing one or more morphological operations on the digital image; and
subtracting the generated first processed digital image from the digital image.

* * * * *